(12) United States Patent
Wang

(10) Patent No.: US 11,540,316 B2
(45) Date of Patent: Dec. 27, 2022

(54) RANDOM ACCESS METHOD AND DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/156,502

(22) Filed: Jan. 22, 2021

(65) Prior Publication Data

US 2021/0144756 A1 May 13, 2021

Related U.S. Application Data

(63) Continuation of application No. PCT/CN2019/086442, filed on May 10, 2019.

(51) Int. Cl.
*H04W 52/24* (2009.01)
*H04W 74/08* (2009.01)
*H04W 56/00* (2009.01)
*H04W 74/00* (2009.01)
*H04W 52/36* (2009.01)

(52) U.S. Cl.
CPC ....... *H04W 74/008* (2013.01); *H04W 52/241* (2013.01); *H04W 52/362* (2013.01); *H04W 56/0045* (2013.01); *H04W 74/0833* (2013.01)

(58) Field of Classification Search
CPC ............. H04W 74/008; H04W 52/241; H04W 52/362; H04W 56/0045; H04W 74/0833; H04W 52/42; H04W 52/00; H04B 17/327
See application file for complete search history.

(56) References Cited

U.S. PATENT DOCUMENTS

2009/0247211 A1* 10/2009 Kuroda ................. H04W 52/50
455/522
2015/0319719 A1* 11/2015 Steudle ................. H04W 24/02
370/216
(Continued)

FOREIGN PATENT DOCUMENTS

CN 102724746 A 10/2012
CN 107888267 A 4/2018
(Continued)

OTHER PUBLICATIONS

International Search Report in the international application No. PCT/CN2019/086442, dated Feb. 1, 2020.
(Continued)

*Primary Examiner* — Ashley Shivers
(74) *Attorney, Agent, or Firm* — Perkins Coie LLP

(57) ABSTRACT

Provided are a random access method and device, which may reduce the latency of a terminal device in a random access process and improve the reliability of a first message (MSG) in the random access process. The method includes that: in response to a terminal device initiating random access to a base station of a target cell and the random access is successful, and the terminal device sends first information to the base station of the target cell, the first information including at least one of an Uplink (UL) Timing Advance (TA) and a parameter related to transmission power for a preamble.

19 Claims, 5 Drawing Sheets

(56) References Cited

U.S. PATENT DOCUMENTS

2017/0135132 A1    5/2017  Selvaganapathy
2019/0230603 A1    7/2019  Liu et al.
2019/0254074 A1 *  8/2019  Jeon .................... H04W 74/004
2019/0313345 A1   10/2019  Jiang et al.

FOREIGN PATENT DOCUMENTS

| CN | 108235305 A | 6/2018 | | |
|---|---|---|---|---|
| CN | 109392076 A | 2/2019 | | |
| WO | WO-2010107354 A1 | * | 9/2010 | ............ H04W 52/50 |
| WO | 2019028881 A1 | 2/2019 | | |

OTHER PUBLICATIONS

Office Action of the Indian application No. 202127001997, dated Jan. 5, 2022. 5 pages with English translation.
Samsung R&D Institute India Bangalore Private Ltd.; Indian Application No. 934/CHE/2010 filed Apr. 1, 2010. 55 pages.
Qualcomm Inc.; Indian Application No. 2550/DELNP/2009 filed Apr. 17, 2009. 42 pages.
First Office Action of the Chinese application No. 202011553158.3, dated Jun. 8, 2022. 25 pages with English Translation.

* cited by examiner

RANDOM ACCESS METHOD AND DEVICE

This application is a continuation of International Patent Application No. PCT/CN2019/086442 filed on May 10, 2019, the disclosure of which is incorporated herein by reference in its entirety.

TECHNICAL FIELD

The disclosure relates to the field of communication, and more particularly to a random access method and device.

BACKGROUND

During random access, a terminal device may perform random access based on a power parameter configured by a base station of a target cell. For example, the terminal device may send a preamble based on the configured power parameter. A power parameter configured by a network device may usually not be too great, so that a terminal device is required to ramp power for many times to successfully send a preamble. However, for a terminal device with a relatively high latency requirement, ramping power for too many times may affect the reliability of data transmission.

SUMMARY

The disclosure provides a random access method and device, which may reduce a latency of a terminal device during random access and improve the reliability of a first message (MSG) during the random access.

A first aspect provides a random access method, which may include that: in response to a terminal device initiating random access to a base station of a target cell and the random access being successful, the terminal device sends first information to the base station of the target cell, the first information including at least one of an Uplink (UL) Timing Advance (TA) and a parameter related to transmission power for a preamble.

A second aspect provides a random access method, which may include that: a terminal device receives updated first configuration information from a base station of a target cell, the first configuration information including at least one of following information: configuration information of transmission power for a preamble and configuration information of UL TA; and the terminal device performs random access according to the updated first configuration information.

A third aspect provides a random access method, which may include that: a base station of a target cell acquires first information, the first information including at least one of following information: a UL TA and a power parameter for transmitting a preamble; and the base station of the target cell updates or configures configuration information of transmission power for the preamble and/or configuration information of the UL TA during the random access according to the first information.

A fourth aspect provides a terminal device, which is configured to implement the method in the first aspect or any optional implementation mode of the first aspect. Specifically, the terminal device includes functional modules configured to implement the method in the first aspect or any optional implementation mode of the first aspect.

A fifth aspect provides a terminal device, which is configured to implement the method in the second aspect or any optional implementation mode of the second aspect. Specifically, the terminal device includes functional modules configured to implement the method in the second aspect or any optional implementation mode of the second aspect.

A sixth aspect provides a network device, which is configured to implement the method in the third aspect or any optional implementation mode of the third aspect. Specifically, the network device includes functional modules configured to implement the method in the third aspect or any optional implementation mode of the third aspect.

A seventh aspect provides a terminal device, which may include a processor and a memory. The memory may be configured to store a computer program, and the processor may be configured to call and run the computer program stored in the memory to implement the method in the first aspect or each implementation mode thereof.

An eighth aspect provides a terminal device, which may include a processor and a memory. The memory may be configured to store a computer program, and the processor may be configured to call and run the computer program stored in the memory to implement the method in the second aspect or each implementation mode thereof.

A ninth aspect provides a network device, which may include a processor and a memory. The memory may be configured to store a computer program, and the processor may be configured to call and run the computer program stored in the memory to implement the method in the third aspect or each implementation mode thereof.

A tenth aspect provides an apparatus, which is configured to implement the method in the first aspect or any possible implementation mode of the first aspect. Specifically, the apparatus includes a processor, configured to call and run a computer program in a memory to cause a device provided with the apparatus to implement the method in the first aspect or any possible implementation mode of the first aspect.

An eleventh aspect provides an apparatus, which is configured to implement the method in the second aspect or any possible implementation mode of the second aspect. Specifically, the apparatus includes a processor, configured to call and run a computer program in a memory to cause a device provided with the apparatus to implement the method in the second aspect or any possible implementation mode of the second aspect.

A twelfth aspect provides an apparatus, which is configured to implement the method in the third aspect or any possible implementation mode of the third aspect. Specifically, the apparatus includes a processor, configured to call and run a computer program in a memory to cause a device provided with the apparatus to implement the method in the third aspect or any possible implementation mode of the third aspect.

A thirteenth aspect provides a computer-readable storage medium, which may be configured to store a computer program, the computer program causing a computer to implement the method in the first aspect or any possible implementation mode of the first aspect.

A fourteenth aspect provides a computer-readable storage medium, which may be configured to store a computer program, the computer program causing a computer to implement the method in the second aspect or any possible implementation mode of the second aspect.

A fifteenth aspect provides a computer-readable storage medium, which may be configured to store a computer program, the computer program causing a computer to implement the method in the third aspect or any possible implementation mode of the third aspect.

A sixteenth aspect provides a computer program product, which may include a computer program instruction, the computer program instruction causing a computer to implement the method in the first aspect or any possible implementation mode of the first aspect.

A seventeenth aspect provides a computer program product, which may include a computer program instruction, the computer program instruction causing a computer to implement the method in the second aspect or any possible implementation mode of the second aspect.

An eighteenth aspect provides a computer program product, which may include a computer program instruction, the computer program instruction causing a computer to implement the method in the third aspect or any possible implementation mode of the third aspect.

A nineteenth aspect provides a computer program, which may run in a computer to cause the computer to implement the method in the first aspect or any possible implementation mode of the first aspect.

A twentieth aspect provides a computer program, which may run in a computer to cause the computer to implement the method in the second aspect or any possible implementation mode of the second aspect.

A twenty-first aspect provides a computer program, which may run in a computer to cause the computer to implement the method in the third aspect or any possible implementation mode of the third aspect.

According to the technical solutions provided in the disclosure, a terminal device may report a power parameter for transmitting a preamble and a parameter related to a position and the like, as well as a UL TA and a parameter related to a position and the like in a random access process to a base station of a target cell to optimize the power parameter and the UL TA, so that a latency during the random access process may be reduced, and the data transmission reliability during the random access process may be improved.

DETAILED DESCRIPTION

Figure 1:
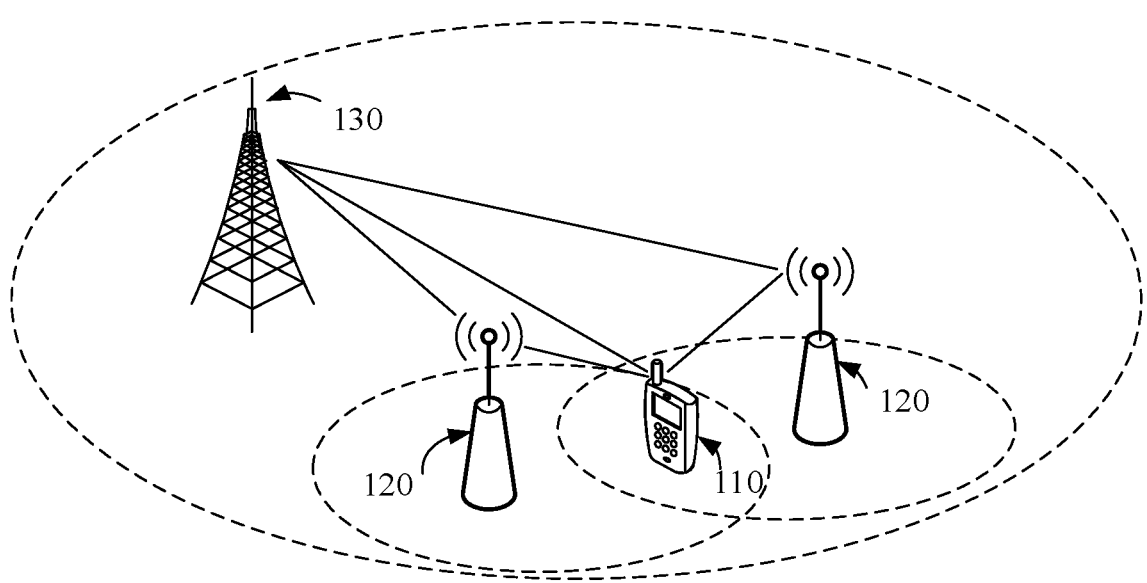
FIG. 1 is a schematic diagram of a wireless communication system to which the embodiments of the disclosure are applied.

FIG. 1 is a schematic diagram of a system 100 according to an embodiment of the disclosure.

As shown in FIG. 1, a terminal device 110 is connected with a first network device 130 in a first communication system and a second network device 120 in a second communication system. For example, the first network device 130 is a Long Term Evolution (LTE) network device, and the second network device 120 is a New Radio (NR) network device.

The first network device 130 and the second network device 120 may include multiple cells.

It should be understood that FIG. 1 is an example of a communication system of the embodiments of the disclosure. The embodiments of the disclosure are not limited to FIG. 1.

As an example, the communication system that the embodiments of the disclosure are applied to may at least include multiple network devices in the first communication system and/or multiple network device in the second communication system.

For example, the system 100 shown in FIG. 1 may include a primary network device in the first communication system and at least one secondary network device in the second communication system. The at least one secondary network device is connected with the primary network device respectively to form multiple connections, and is connected with the terminal device 110 to provide service for it respectively. Specifically, the terminal device 110 may simultaneously establish connections with the primary network device and the secondary network device.

Optionally, the connection established by the terminal device 110 and the primary network device is a primary connection, and the connection established by the terminal device 110 and the secondary network device is a secondary connection. Control signaling of the terminal device 110 may be transmitted through the primary connection. Data of the terminal device 110 may be simultaneously transmitted through the primary connection and the secondary connection or may also be transmitted through the secondary connection only.

As another example, in the embodiment of the disclosure, the first communication system and the second communication system may be different. Specific types of the first communication system and the second communication system are not limited.

For example, the first communication system and the second communication system may be various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, LTE Time Division Duplex (TDD) and a Universal Mobile Telecommunication System (UMTS).

The primary network device and the secondary network device may be any access network devices.

Optionally, in some embodiments, the access network device may be a Base Transceiver Station (BTS) in the GSM or the CDMA system, or may be a NodeB (NB) in the WCDMA system, or may be an Evolutional Node B (eNB or eNodeB) in the LTE system.

Optionally, the access network device may be a base station (gNB) in a Next Generation Radio Access Network (NG RAN) or an NR system or a wireless controller in a Cloud Radio Access Network (CRAN). Or the access network device may be a relay station, an access point, a vehicle device, a wearable device or a network device in a future evolved Public Land Mobile Network (PLMN), etc.

In the system 100 shown in FIG. 1, for example, the first network device 130 is a primary network device, and the second network device 120 is a secondary network device.

The first network device 130 may be an LTE network device, and the second network device 120 may be an NR network device. Or the first network device 130 may be an NR network device, and the second network device 120 may be an LTE network device. Or both the first network device 130 and the second network device 120 may be NR network devices. Or the first network device 130 may be a GSM network device, a CDMA network device and the like, and the second network device 120 may be a GSM network device, a CDMA network device and the like. Or the first network device 130 may be a Macrocell, and the second network device may be a Microcell, a Picocell and a Femtocell, etc.

Optionally, the terminal device 110 may be any terminal device. The terminal device 110 includes, but not limited to:

a device configured to receive/send a communication signal through a wired connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device configured to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in a 5th-Generation (5G) network, a terminal device in the future evolved PLMN or the like.

It should be understood that terms "system" and "network" in the disclosure may usually be exchanged in the disclosure.

In the embodiments of the disclosure, the network device provides service for a cell, and the terminal device communicates with the network device through a transmission resource (for example, a frequency-domain resource or a spectrum resource) for the cell. The cell may be a cell corresponding to the network device (for example, a base station). The cell may belong to a macro base station or may be a base station corresponding to a small cell. Here, the small cell may include: a metro cell, a micro cell, a pico cell, a femto cell and the like. These small cells have the characteristics of small coverage and low transmitted power and are applied to provision of high-rate data transmission service.

It should be understood that a method of the embodiments of the disclosure may be adopted to transmit various types of services. For a 5G system, application scenarios of the embodiment of the disclosure may include Enhance Mobile Broadband (eMBB), Ultra-Reliable and Low latency Communication (URLLC) and massive Machine Type Communication (mMTC).

eMBB is taken as an example. eMBB aims to enable a user to obtain a multimedia content, service and data, and requirements thereof increase rapidly. eMBB is taken as an example again. Since eMBB may be deployed in different scenarios, for example, a room, an urban area and a rural area, and capabilities and requirements thereof are also greatly different, detailed analysis may be made in combination with a specific deployment scenario. URLLC is taken as another example. Typical applications of URLLC include industrial automation, power automation, remote medical operation (surgical operation), traffic safety guarantee and the like. Typical characteristics of mMTC include high connection density, small data volume, latency-insensitive services, low cost and long service life of modules and the like.

A deployment mode of the system is not specifically limited in the embodiment of the disclosure.

For example, during early deployment of NR, it is difficult to implement complete NR coverage, and thus typical network coverage includes wide area LTE coverage and NR island coverage. Moreover, LTE is mostly deployed below 6 GHz and there are few spectrums for 5G below 6 GHz, so researches on application of spectrums above 6 GHz for NR are required. However, a high band is limited in coverage and fast in signal fading. Meanwhile, for protecting early LTE investments of a mobile operating company, a working mode of tight interworking between LTE and NR is proposed, i.e., a Multi-Radio Access Technology (RAT) Dual Connectivity (MR-DC) mode.

For another example, an NR cell may also be deployed independently. A beam may be adopted for transmission in an NR cell. A cell may include multiple beams.

A terminal device, before establishing a radio resource control (RRC) connection with a network device, is required to execute a random access process, namely initiating random access to the network device, and under the condition that random access succeeds, may establish the RRC connection with the network device. After the terminal device establishes the RRC connection with the network device, data may be subsequently transmitted.

The terminal device can be triggered by multiple events to perform random access, the events including: an initial access process of the terminal device; a reestablishment process of the terminal device; a condition that the terminal device has UL data to be sent but detects UL asynchrony; a condition that the terminal device has UL data to be sent but there is no scheduling request (SR) resource; a condition that the terminal device requires cell handover; and a condition that a base station has downlink data to be sent but detects UL asynchrony.

A random access manner of the terminal device is not specifically limited in the embodiments of the disclosure. For example, contention-based random access may be adopted, or contention-free random access may also be adopted. For another example, the terminal device may adopt a 4-step random access manner for random access or may also adopt a 2-step random access manner for random access.

Random access processes will be described below in combination with FIG. 2 to FIG. 3.

Figure 2:
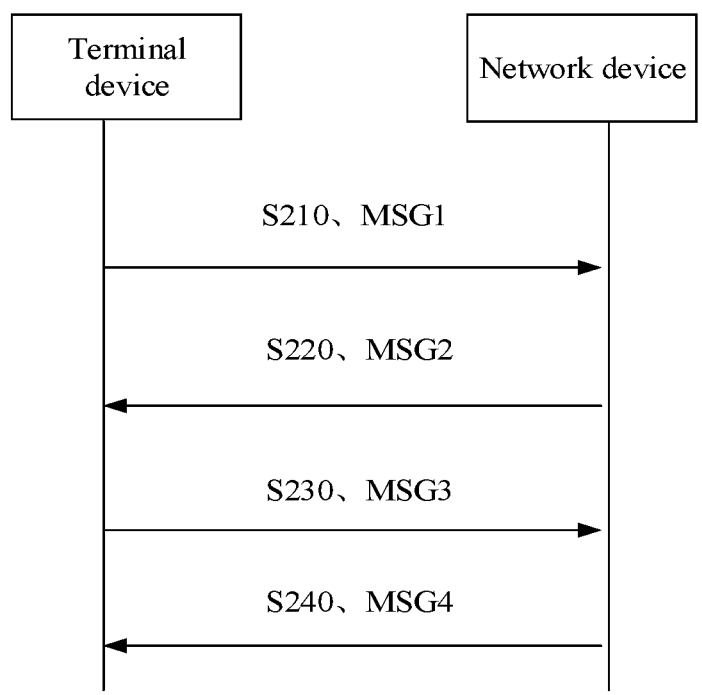
FIG. 2 is a schematic diagram of a contention-based random access process according to an embodiment of the disclosure.

FIG. 2 illustrates a contention-based random access process. The random access process may also be called a 4-step random access process. The process may include the following S210 to S240.

In S210, the terminal device sends a message1 (MSG1) to the network device in a random access channel, the MSG1 including a preamble for random access. The MSG1 may be a physical-layer message.

The terminal device, before sending the MSG1, may select the preamble to be sent and a Physical Random Access Channel (PRACH) resource for transmitting the preamble. Under a normal condition, there may be 64 preambles that may be selected by the terminal device in a cell, and an index of each preamble is an integer from 0 to 63. The terminal device may select one of the 64 preambles and transmit the selected one to the network device.

In S220, the network device, after receiving the MSG1, may send an MSG2 in a Downlink Shared Channel (DL-SCH). The MSG2 may be an RAR. The MSG2 may be a MAC-layer message.

The network device may calculate, based on the PRACH resource adopted by the terminal device to send the preamble, a Random Access Radio Network Temporary Identifier (RA-RNTI) configured to scramble the MSG2.

The RAR contains a TA adjustment and available UL resource information for UL transmission as well as a Temporary Cell Radio Network Temporary Identifier (T-CRNTI), i.e., a temporary Cell Radio Network Temporary Identifier (C-RNTI).

Optionally, the RAR may be generated by a MAC layer of the network device. An MSG2 may simultaneously correspond to random access requests of multiple terminal devices.

In S230, the terminal device, after receiving the MSG2, may determine the RA-RNTI for scrambling the MSG2 based on the PRACH resource for transmitting the preamble and decode the MSG2 using the RA-RNTI. If the terminal device succeeds in decoding, it is indicated that the MSG2 is an RAR message for the terminal device. Then, the terminal device may send an MSG3 in a UL resource specified in the MSG2, the MSG3 containing a specific radio network temporary identity (RNTI) of the terminal device. The MSG3 may be an RRC-layer MSG.

In S240, the network device, after receiving the MSG3, may send an MSG4 to the terminal device. The MSG4 includes a contention resolution message and a UL transmission resource allocated to the terminal device by the network device. The MSG4 may be a MAC-layer message.

The terminal device, after receiving the MSG4, may detect whether the specific RNTI sent through the MSG3 is included in the contention resolution message from the network device or not. If included, it is indicated that the random access process of the terminal device succeeds, otherwise it is determined that the random access process fails. After the random access process fails, the terminal device needs to restart initiating a random access process from the first step.

Optionally, a hybrid automatic repeat request (HARQ) mechanism may not be adopted for the MSG1 and the MSG2, while the HARQ mechanism may be adopted for the MSG3 and the MSG4.

When failing in a random access try, the terminal device may further initiate a next random access try until a maximum retransmission count and/or maximum retransmission time allowed by a network side are/is reached.

The terminal device usually sends the preamble to the network device for random access. If the terminal device fails in present random access after sending the preamble for the first time, the terminal device may send the preamble for random access to the network device for the second time. The transmission power for the preamble for the second time may be transmission power obtained after the transmission power for the preamble for the first time is ramped. A power ramping step size may be configured by the network device or may be pre-configured in the terminal device.

Figure 3:
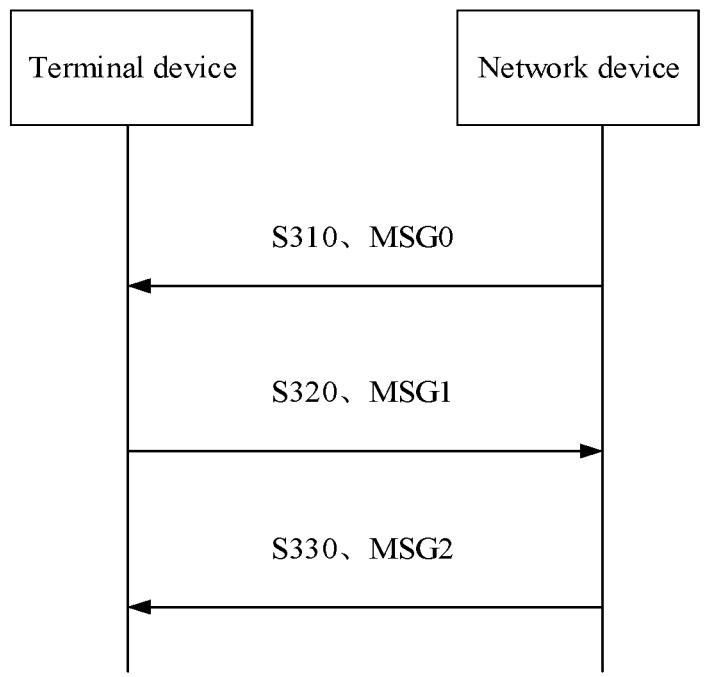
FIG. 3 is a schematic diagram of a contention-free random access process according to an embodiment of the disclosure.

FIG. 3 illustrates a contention-free random access process. The process may include the following operations S310 to S330.

In S310, the network device sends an MSG0 to the terminal device. The MSG0 may include a preamble configuration message, and is configured to indicate a preamble for random access. The MSG0 may be a physical-layer message.

In S320, the terminal device sends an MSG1 to the network device, the MSG1 including the preamble for random access in S310. The MSG1 may be a physical-layer message.

In S330, the network device sends an MSG2 to the terminal device. The MSG2 may be an RAR message. The MSG2 may be a MAC-layer message.

In the contention-free random access process, the terminal device may acquire a contention-free random access resource through RRC signaling and/or physical downlink control channel (PDCCH) signaling and perform random access on the contention-free random access resource.

A MAC-layer data format of the RAR may be shown in FIG. 4 to FIG. 7.

A MAC RAR may be born in a MAC protocol data unit (PDU). A MAC PDU may structurally include three parts. The first part is a MAC header, and a size of the MAC header is variable. The second part is an RAR load, and the RAR load may include one or more MAC RARs. The third part is padding information, and the padding information is optional.

Figure 4:
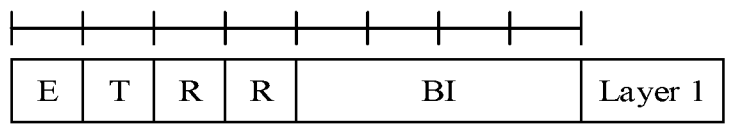
FIG. 4 is a structure diagram of a random access response (RAR) format according to an embodiment of the disclosure.
Figure 5:
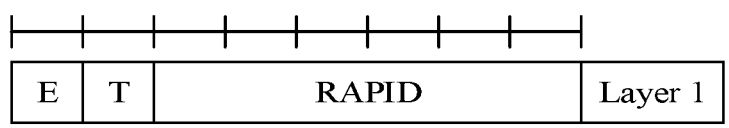
FIG. 5 is a structure diagram of another RAR format according to an embodiment of the disclosure.

A MAC header may include one or more MAC subheaders. A MAC header may include two types of subheaders, as shown in FIG. 4 and FIG. 5. FIG. 4 and FIG. 5 are structure diagrams of two types of MAC subheaders. The two types of subheaders may be distinguished by a type field "T". T=0 may be configured to indicate that a random access Backoff Indicator (BI) "BI" is presented next, as shown in FIG. 4, and the BI may be configured to indicate backoff time for retransmission of the MSG1. T=1 may indicate that a random access preamble identifier (RAPID) is presented next, as shown in FIG. 5.

In MAC subheader fields, a field "E" represents an extension field, and is configured to indicate whether there is subsequently any other MAC subheader or not. E=1 indicates that there is subsequently another MAC subheader. E=0 indicates that there is subsequently no MAC subheader. The field "T" represents a type field, and is configured to indicate whether the "BI" or the "RAPID" is presented next. T=1 indicates that a RAPID field is presented next. T=0 indicates that a BI field is presented next. The RAPID is a response of the network device to the preamble in the received MSG1. A value of the RAPID may be a value of the preamble sent to the network device by the terminal device. The field "BI" represents the BI, and is configured to indicate the backoff time for retransmission of the MSG1.

Figure 6:
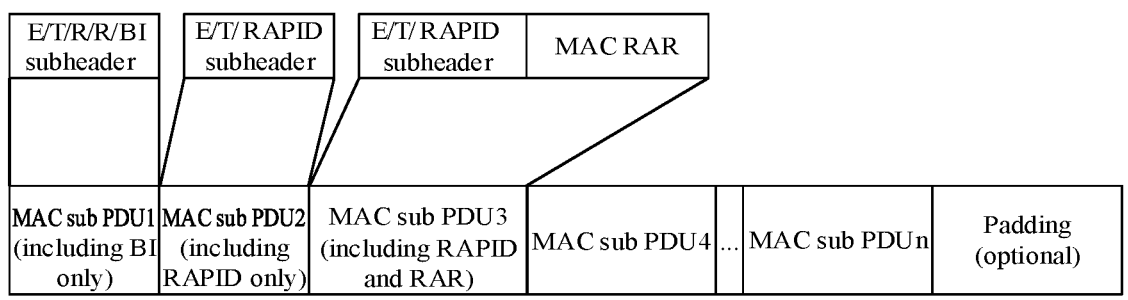
FIG. 6 is a structure diagram of a media access control (MAC) protocol data unit (PDU) according to an embodiment of the disclosure.

FIG. 6 is a structure diagram of a MAC RAR in a MAC PDU. A MAC header shown in FIG. 6 includes multiple subheaders. A MAC header may also include one MAC subheader.

Figure 7:
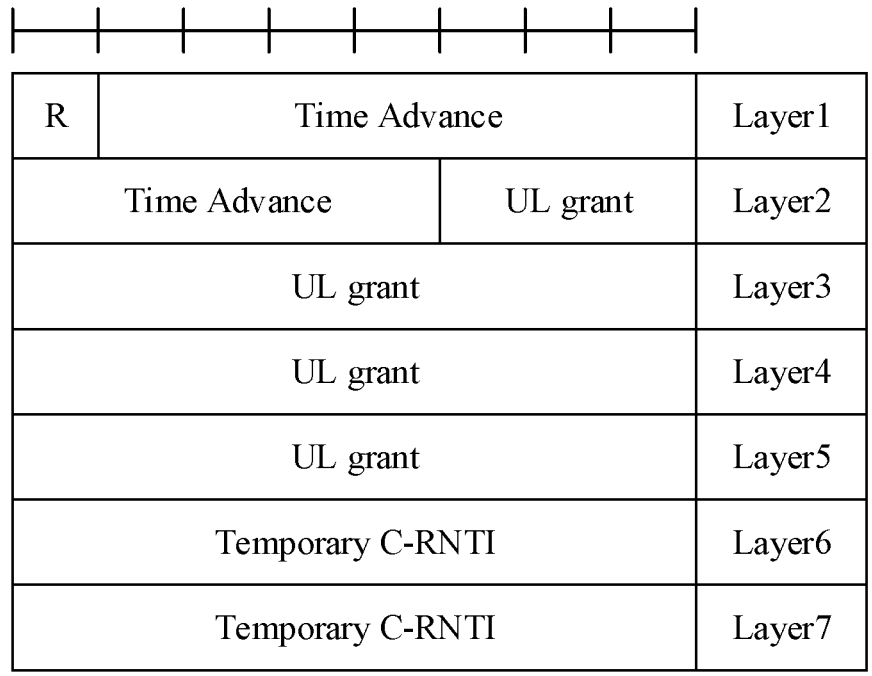
FIG. 7 is a structure diagram of another RAR format according to an embodiment of the disclosure.

When a certain RAR is of a RAPID type, a structure of the RAR may be shown in FIG. 7. A field "R" is a reserved bit, and is fixedly padded with 0. The RAR may include at least one of the following information: a UL TA, UL grant information and a T-CRNTI. The UL grant information is configured to indicate a UL resource available for the terminal device to send a message. The UL TA is configured to adjust a UL time sequence for UL data transmission by the terminal device. The T-CRNTI is configured to scramble a PDCCH in the MSG4.

After the terminal device sends the preamble, there may be such a condition that the network device may not receive the preamble. The condition that the network device may not receive the preamble may be caused by the fact that the transmission power adopted by the terminal device to send the preamble is relatively low. The terminal device, in a case of not receiving any RAR in pre-configured time, needs to perform power ramping to increase transmission power for the preamble and send the preamble at the increased transmission power.

Power adopted by the terminal device to send the preamble every time may be calculated through the following formula:

transmission power for a preamble=expected receiving power for the preamble+power offset+ (ramping count for the preamble−1)*power ramping step size.

The expected receiving power for the preamble represents power expected to be received by a base station of a target cell, i.e., power, expected to be received by the base station of the target cell, for the preamble after the terminal device sends the preamble to the base station of the target cell.

The power offset is related to a format of the preamble, as shown in Table 1. When the format of the preamble is 0 and 1, the power offset is 0 dB. When the format of the preamble is 2 and 3, the power offset is −3 dB. When the format of the preamble is 4, the power offset is 8 dB.

TABLE 1

| Format of the preamble | Power offset |
| --- | --- |
| 0 | 0 dB |
| 1 | 0 dB |
| 2 | −3 dB |
| 3 | −3 dB |
| 4 | 8 dB |

The expected receiving power for the preamble, the power offset and the power ramping step size may be configured by the network device. For example, the network device may broadcast configuration information of the transmission power for the preamble. The configuration information may include the expected receiving power, the power offset and the power ramping step size. The terminal device, when sending the preamble for the first time, may determine the transmission power according to the expected receiving power and the power offset. After failing in sending the preamble for the first time, the terminal device may perform power ramping according to the power ramping step size configured by the network device and send the preamble based on power obtained by ramping. The steps are repeated until the terminal device receives the RAR from the network device.

The power configuration information broadcast by the network device is not always suitable for the terminal device. For example, the terminal device may be required to perform power ramping for many times to successfully send the preamble, which increases a latency of the terminal device during the random access and is favorable for the terminal device to rapidly access a network to execute a service. However, the expected receiving power configured for the terminal device by the network device may also not be too high because excessively high power may cause UL interference. Therefore, how a network device configures transmission power for a preamble for a terminal device to reduce latency of the terminal device in a random access process becomes a problem urgent to be solved.

In addition, a terminal device may usually know UL TA only after receiving a RAR from a network device and then may transmit data according to the TA. Therefore, the terminal device, when sending a preamble, does not know the UL TA, resulting in reduction of the reliability of the preamble. Therefore, how to improve the reliability of a preamble from a terminal device becomes a problem urgent to be solved.

Figure 8:
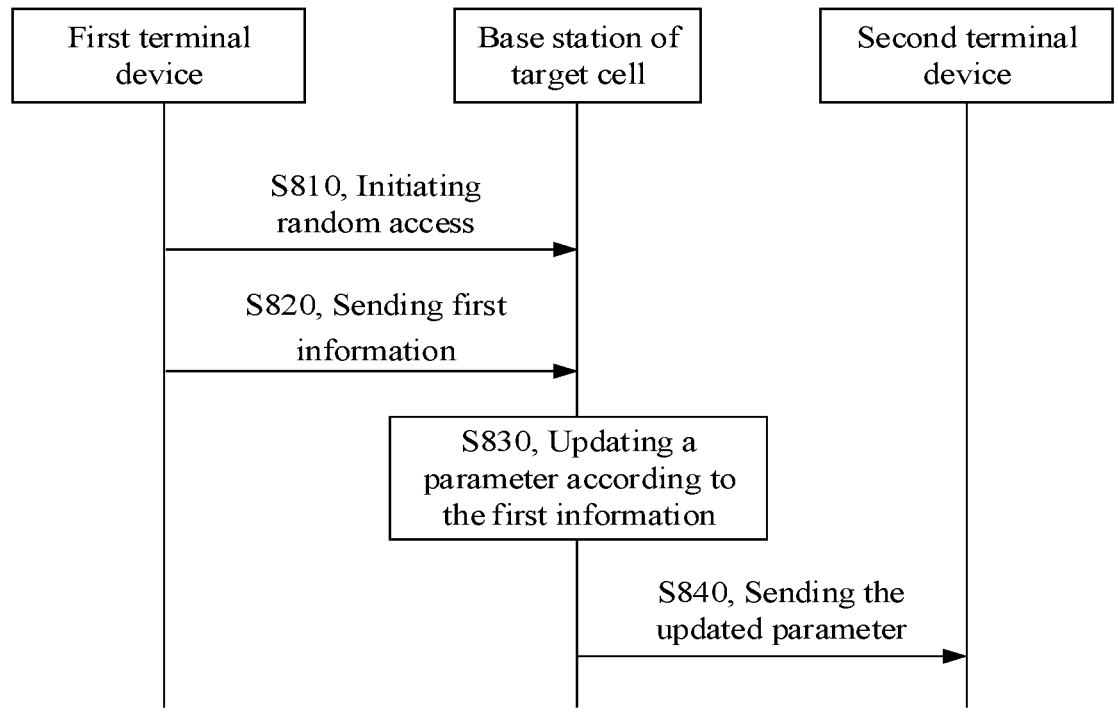
FIG. 8 is a schematic diagram of a random access method according to an embodiment of the disclosure.

An embodiment of the disclosure provides a random access method. The latency of a terminal device in a random access process may be reduced, and the reliability of a preamble sent by the terminal device may be improved. As shown in FIG. 8, the method includes S810 to S820.

In S810, a first terminal device initiates random access to a base station of a target cell.

The first terminal device, before establishing an RRC connection with the base station of the target cell, is required to initiate random access to the base station of the target cell and may establish the connection with the base station of the target cell only after random access succeeds.

The base station of the target cell may refer to the above-described network device. The base station of the target cell may refer to a base station where the target cell is located, and the target cell may refer to a cell that the terminal device expects to access. A base station may include one target cell or may also include multiple target cells.

In S820, the first terminal device sends first information to the base station of the target cell. The first information includes at least one of: a UL TA and a power parameter for transmitting a preamble.

The first information may further include at least one of the following information: the preamble for random access of the first terminal device, identification information of the target cell, signal quality of the target cell, a beam index adopted by the first terminal device, signal quality of at least one beam in the target cell, a sequence of the signal quality of the at least one beam in the target cell, and position information of the terminal device.

The first terminal device, when reporting the first information, may report to the base station of the target cell in a random access process and may also report to the base station of the target cell in an RRC connected state after random access is completed. For example, the first terminal device may report the first information to the base station of the target cell responsive to completion of random access.

The power parameter for transmitting a preamble may include a power ramping count of the first terminal device in the random access process and/or a power level of the first terminal device.

The power ramping count may reflect a latency of the first terminal device in the random access process to a certain extent, and if the power ramping count is larger, it is indicated that the latency of the first terminal device in the random access process is longer. The base station of the target cell may optimize the transmission power for preamble according to the power ramping count.

The power level of the first terminal device may represent power adopted by the first terminal device to send the preamble for the last time, and the base station of the target cell may optimize the transmission power for the preamble according to expected receiving power and the power adopted by the first terminal device to send the preamble for the last time. If a difference between the expected receiving power and the last transmission power is relatively great, it is indicated that the base station of the target cell is required to optimize the transmission power for the preamble.

Since the power ramping step size is configured for the terminal device by the base station of the target cell, the terminal device may not report the power ramping step size. Of course, the terminal device may also report the power ramping step size to the base station of the target cell.

The UL TA may be obtained by the first terminal device from an RAR sent by the base station of the target cell. Since the UL TA is sent to the first terminal device by the base station of the target cell, the first terminal device may also not be required to report the UL TA to the base station of the target cell and is only required to report information of its own identifier and/or position, etc. to the base station of the target cell.

The signal quality of the target cell includes at least one of the following information: reference signal receiving power (RSRP) of the target cell, reference signal received quality (RSRQ) of the target cell, and a signal-to-interference-and-noise-ratio (SINR) of the target cell.

The signal quality of the at least one beam in the target cell may include at least one of the following information: RSRP of the at least one beam as well as a beam index of the at least one beam, RSRQ of the at least one beam as well as the beam index of the at least one beam, and an SINR of the at least one beam as well as the beam index of the at least one beam. That is, the first terminal device, when reporting the signal quality of a beam, may also report the index of the beam to the base station of the target cell to determine the specific beam corresponding to the beam signal quality reported by the first terminal device.

The at least one beam may refer to all beams in the target cell or may also refer to part of beams in the target cell. For example, there are 10 beams in the target beam. The first terminal device may report signal quality of all the 10 beams to the base station of the target cell, or, the first terminal device may also measure only 5 beams and report the signal quality of the 5 beams to the base station of the target cell.

The signal quality of the target cell may be determined according to the signal quality of the at least one beam in the target cell. For example, the signal quality of the target cell may be obtained by averaging the signal quality of the at least one beam in the target cell.

The sequence of the signal quality of the at least one beam in the target cell may refer to that the first terminal device may sequence the measured signal quality of the at least one beam from high to low quality or from low to high quality and report a sequence of the at least one sequenced beam to the base station of the target cell. For example, the first terminal device may report a sequence of the sequenced at least one beam index to the base station of the target cell.

The sequence of the signal quality of the at least one beam may be a sequence obtained according to magnitudes of the RSRP, or may also be a sequence obtained according to magnitudes of the RSRQ, or may also be a sequence obtained according to magnitudes of the SINRs. The first terminal device may also comprehensively sequence the RSRP, RSRQ and SINR of the at least one beam. No specific limits are made thereto in the embodiment of the disclosure.

The first terminal device may record the first information in the random access process and report the first information to the base station of the target cell after the random access is completed. For example, the first terminal device may record the power ramping count in the random access process, the identification information of the target cell, the presently adopted beam index, the signal quality of the target cell, the signal quality of the at least one beam in the target cell, the sequence of the signal quality of the at least one beam in the target cell, the position information of the terminal device and the like in the random access process.

Recording the first information may refer to that the first terminal device stores the first information or may also refer to that the first terminal device measures the first information. For example, the first terminal device may measure the signal quality of the cell and/or measure the quality of the at least one beam in the target cell.

A moment when the first terminal device records the first information is not specifically limited in the embodiment of the disclosure, and the first terminal device may record the first information at any moment in the random access process.

As an implementation mode, the first information may be recorded at at least one moment of the following moments: a moment when the first terminal device receives an RAR message from the base station of the target cell, a moment when the first terminal device sends the preamble, and a moment when the first terminal device completes random access.

The moment when the first terminal device sends the preamble may be understood as a moment when the first terminal device sends a first message in the random access process.

For contention-based random access, the moment when random access is completed may refer to a moment when the first terminal device receives an MSG4 and the MSG4 indicates that a contention is successfully resolved. For contention-free random access, the moment when random access is completed may refer to a moment when the first terminal device receives the RAR message from the base station of the target cell.

The first terminal device may record the first information in each random access process. Or, the first terminal device may record the first information only in a last random access process.

In the embodiment of the disclosure, the first information may be configured for the base station of the target cell to update or configure the UL TA and/or transmission power for the preamble.

In a case that the base station of the target cell does not broadcast the UL TA before, the base station of the target cell may configure the determined UL TA for the terminal device. In a case that the base station of the target cell has broadcast the UL TA before, the base station of the target cell may update the UL TA that was broadcast before.

The UL TA may be broadcast through a dedicated system message or may also be broadcast by using a previous system message.

Updating or configuring the UL TA may refer to that the base station of the target cell broadcasts the UL TA in advance through a system message. For example, the UL TA may be broadcast at the same time when the transmission power for the preamble is broadcast. Updating the transmission power for the preamble may refer to that the base station of the target cell broadcasts updated transmission power according to the first information reported by the first terminal device after broadcasting the transmission power for the preamble.

That the first terminal device sends the first information to the base station of the target cell after random access is completed may refer to that the first terminal device immediately reports the first information to the base station of the target cell after random access is completed. For example, the first terminal device may immediately report the first information to the base station of the target cell after receiving a message indicating that the contention is successfully resolved. Or, that the first terminal device sends the first information to the base station of the target cell after random access is completed may refer to that the first terminal device reports the first information to the base station of the target cell at a certain moment that is after a preset time interval since from completion of random access.

The embodiment of the disclosure may also not be limited to reporting the first information to the base station of the target cell after random access is completed. For example, the first terminal device may report the first information to the base station of the target cell after receiving the RAR from the base station of the target cell. For example, in some cases, the first terminal device may report the first information to the network device through an MSG3.

For convenient description, in the embodiment of the disclosure, a content of the first information is divided into information a and information b for description. The information a includes at least one of following information: the UL TA and the power parameter for transmitting the preamble. The information b includes other information in the first information than the information a.

The first terminal device may report the preamble adopted in the random access process to the base station of the target cell such that the base station of the target cell establishes corresponding relationships between different preambles and transmission power and/or UL TAs. The first terminal device may report the identification information of the target cell such that the base station of the target cell can determine a specific cell where the first terminal device is located. The first terminal device may report the presently adopted beam index such that the base station of the target cell can determines a specific beam adopted by the first terminal device for random access.

In a case that the base station of the target cell can determine such information of the first terminal device by itself, the first terminal device may also not be required to report the information to the base station of the target cell.

In the embodiment of the disclosure, the first terminal device may report the information b so that the base station of the target cell can determine position information of the first terminal device and thus the base station of the target cell can optimize a parameter in the random access process according to the position information of the terminal device and the UL TA, or the base station of the target cell can optimize the parameter in the random access process according to the position information of the terminal device and the transmission power for the preamble.

As an example, when the base station of the target cell optimizes the power parameter, the position information of the terminal device may be considered. For example, if latency of multiple terminal devices is relatively high in a central region of the target cell, the base station of the target cell may optimize the power parameter, for example, increasing the expected receiving power or increasing the power ramping step size. If the latency of the terminal device in the central region can meet a requirement but latency of a terminal device in an edge region is relatively high, the base station of the target cell may optimize the power parameter or may not optimize it. An optimization manner of the base station of the target cell may be determined by specific implementation of a network and will not be specifically limited in the embodiment of the disclosure.

During reporting, the first terminal device may only report the power parameter for transmitting a preamble and is not required to report other information such as position information. The base station of the target cell may optimize the transmission power for the preamble only according to power parameters reported by multiple first terminal devices. For example, if latency of more than 50% of terminal devices among reporting terminal devices is relatively high, the base station of the target cell may optimize the transmission power for the preamble. If the latency of only less than 10% of terminal devices among the reporting terminal devices is relatively high, the base station of the target cell may not be required to optimize the transmission power for the preamble.

As another example, the base station of the target cell, after receiving first information reported by a large number of first terminal devices, may determine information of UL TAs, corresponding to different random-access positions, of the first terminal devices, and then the base station of the target cell may broadcast corresponding relationships between different positions and the UL TAs to terminal devices through a system message. Then, a second terminal device required to access the target cell may determine its own UL TA according to the corresponding relationship and then perform random access based on the UL TA.

The signal quality of the target cell, the signal quality of the at least one beam in the target cell and the sequence of the signal quality of the at least one beam in the target cell in the information b may reflect the position information of the terminal device to a certain extent.

As a possible implementation mode, the first information includes the power parameter for transmitting a preamble. The first information may further include at least one of the following information: the signal quality of the target cell, the signal quality of the at least one beam in the target cell, the sequence of the signal quality of the at least one beam in the target cell, and the position information of the terminal device.

As another possible implementation mode, the first information includes the UL TA. The first information may further include at least one of the following information: the signal quality of the target cell, the signal quality of the at least one beam in the target cell, the sequence of the signal quality of the at least one beam in the target cell and the position information of the terminal device.

In the embodiment of the disclosure, the terminal device may report the power parameter in the random access process and the information b to the base station of the target cell after random access succeeds such that the base station of the target cell can optimize the power parameter for the preamble based on the power parameter and the information b to reduce the latency of the terminal device in the random access process. In addition, the first terminal device may report the UL TA and the information b to the base station of the target cell, then the base station of the target cell may broadcast a corresponding relationship between the UL TA and the information b to terminal devices and the second terminal device subsequently required to access the base station of the target cell may determine the UL TA corresponding to its present position in the broadcast message and is not required to wait for receiving an RAR to determine the UL TA, so that the UL TA may be adopted when the first messaging the random access process is sent, and the reliability of the first message in the random access process may be improved.

The UL TA reported by the first terminal device may be obtained by the terminal device from the RAR after receiving the RAR from the base station of the target cell in the random access process.

When the first terminal device sends the first information to the base station of the target cell, the first information may be sent to the base station of the target cell under the condition that the base station of the target cell supports a function of optimizing the parameter for random access. For a base station not supporting the function of optimizing the parameter for random access, the first terminal device may not be required to send the first information to the base station. Under this condition, the first terminal device may also not be required to record the first information.

Supporting the function of optimizing the parameter for random access may refer to that the base station supports the parameter in the random access process to be updated, for example, supporting the power parameter for transmitting the preamble to be updated or supporting the UL TA to be broadcast or updated.

When the first terminal device reports the first information to the base station of the target cell, the first terminal device may actively report the first information to the base station of the target cell, or the first terminal device may also send the first information to the base station of the target cell based on a request of the base station of the target cell.

As an example, the first terminal device may receive a request message from the base station of the target cell, the request message being configured to instruct the first terminal device to send the first information to the base station of the target cell. The first terminal device, after receiving the request message, may send the first information to the base station of the target cell based on the request message.

As another example, the first terminal device may send first indication information to the base station of the target cell after random access is completed, the first indication information being configured to indicate that the first information is recorded in the first terminal device or the first indication information being configured to indicate that information configured to optimize the parameter in the random access process is recorded in the first terminal device. The base station of the target cell, after receiving the first indication information, may determine whether the request message is required to be sent to the terminal device to request the first terminal device to send the first information or not according to its own condition.

For example, in a case that the base station of the target cell supports the function of optimizing the parameter for random access, the base station of the target cell may send the request message to the first terminal device. In a case that the base station of the target cell does not support the function of optimizing the parameter for random access, the base station of the target cell may not send the request message to the first terminal device.

When the first terminal device sends the first indication information to the base station of the target cell, the first indication information may be directly sent to the base station of the target cell after random access is completed, or, the first terminal device may also send the first indication information to the base station of the target cell under the condition that the base station of the target cell supports the function of optimizing the parameter for random access.

The base station of the target cell may broadcast whether the function of optimizing the parameter for random access is supported or not, and then the first terminal device may determine whether the first indication information and/or the first information are/is required to be sent to the base station of the target cell or not, so that reduction of the signaling overhead is facilitated. For example, the base station of the target cell may broadcast second indication information, the second indication information being configured to indicate that the base station of the target cell supports the function of optimizing the parameter for random access. The first terminal device, after receiving the second indication information, may send the first indication information and/or the first information to the base station of the target cell.

The second indication information broadcast by the base station of the target cell may be broadcast through the system message.

The first indication information may be born in at least one of the following messages: an RRC connection establishment complete message, an RRC reestablishment complete message, and an RRC connection resume complete message.

The first information sent by the first terminal device may be sent through dedicated signaling. For example, the first terminal device may send a first message to the base station of the target cell. The first message is dedicated to bearing the first information.

The base station of the target cell may perform parameter optimization based on first information reported by multiple first terminal devices. A specific optimization process may be determined by product implementation of the network.

For example, the first information may include the power ramping count and position information of the first terminal device. The base station of the target cell may determine an optimization solution based on power ramping counts and position information reported by the multiple first terminal devices. When the base station of the target cell determines that the power ramping counts of the multiple first terminal devices are relatively large at a certain position or in a certain region, the base station of the target cell may optimize a power parameter of the position or the region, for example, increasing expected receiving power and/or increasing a power ramping step size.

The method shown in FIG. 8 may include S830 and S840.

In S830, the base station of the target cell, after receiving the first information reported by the first terminal device, may update or configure configuration information in the random access process. The configuration information may include at least one of the following information: configuration information of the transmission power for the preamble and/or configuration information of the UL TA. After the configuration information is configured or updated, the base station of the target cell may broadcast updated configuration information.

For convenient description, in the embodiment of the disclosure, the updated configuration information is called first configuration information, and the configuration information that is not updated is called second configuration information. The second configuration information may be broadcast by the base station of the target cell before receiving the first information from the first terminal device. The first configuration information may be broadcast by the base station of the target cell after receiving the first information from the first terminal device.

The first configuration information may be sent by the network device after sending the second configuration information. The first configuration information may be received by the second terminal device before receiving the RAR message from the base station of the target cell.

Information in the first configuration information and the second configuration information may be the same or may also be different. For example, each of the first configuration information and the second configuration information includes power configuration information and/or UL TA configuration information. For another example, the second configuration information does not include UL TA configuration information, while the first configuration information may include UL TA configuration information. For another example, the first configuration information may include information that is updated in the second configuration information only, and the base station of the target cell may not broadcast information that is not updated.

That the information in the first configuration information and the second configuration information is the same does not represent that contents of the first configuration information and the second configuration information are the same but represents that each of the first configuration information and the second configuration information may include the power configuration information but specific parameters of the power configuration information are different.

In S840, the second terminal device may receive the first configuration information from the base station of the target cell for random access. For example, the second terminal device may perform random access based on the first configuration information sent by the base station of the target cell.

The second terminal device may receive the first configuration information before random access succeeds. For example, the second terminal device may receive the first configuration information before receiving the RAR message sent by the base station of the target cell.

The configuration information of the transmission power for the preamble may include the expected receiving power for the preamble, the transmission power offset for the preamble and an adjustment step of the transmission power for the preamble.

The base station of the target cell, when broadcasting the updated configuration information, may broadcast at least one of following information: the expected receiving power for the preamble, the transmission power offset of the preamble, and the adjustment step of the transmission power for the preamble.

The second terminal device, after receiving the updated configuration information of the transmission power for the preamble, may perform random access according to the updated configuration information of the transmission power for the preamble. For example, the second terminal device may send the preamble according to the updated expected receiving power, and/or send the preamble according to the updated transmission power offset and/or send the preamble according to the updated transmission power adjustment step size.

The configuration information of the UL TA may include at least one of the following information: the UL TA and a corresponding relationship between the UL TA and a first parameter. The first parameter may include at least one of the following information: the preamble for the random access, the identification information of the target cell, the signal quality of the target cell, the signal quality of the at least one beam in the target cell, the sequence of the signal quality of the at least one beam in the target cell, the position information of the terminal device, a threshold of a synchronization signal block (SSB), and an SSB group meeting the threshold.

As a preferred implementation mode, the configuration information of the UL TA may include the corresponding relationship between the UL TA and the first parameter. The first parameter may include at least one of the following information: the signal quality of the target cell, the signal quality of the at least one beam in the target cell, the sequence of the signal quality of the at least one beam in the target cell, the position information of the terminal device, the threshold of the SSB and the SSB group meeting the threshold.

Under the condition that the configuration information of the UL TA includes the UL TA, all second terminal devices required to access the target cell may adopt the UL TA for random access.

The UL TA may refer to a value of the UL TA or may refer to a value range of the UL TA.

Under the condition that the UL TA is the value range of the UL TA, the second terminal device may randomly select one from the value range as the UL TA.

The base station of the target cell, when broadcasting the updated UL TA configuration information, may broadcast the UL TA only or may also broadcast the corresponding relationship between the UL TA and the first parameter.

The SSB may refer to the above-described beam, and the threshold of the SSB may refer to a threshold of the signal quality of the beam. Different thresholds may be set for different beams.

The SSB group meeting the threshold may refer to a combination of beams meeting the threshold.

The second terminal device may monitor the system message to determine whether the base station of the target cell broadcasts the first configuration information or not. In response to detecting that the base station of the target cell broadcasts the first configuration information, the second terminal device may receive the first configuration information. The second terminal device, after receiving the first configuration information, may update the second configuration information received before to the first configuration information, that is, the second terminal device may replace the second configuration information with the first configuration information.

For the condition that the first configuration information includes the configuration information of the UL TA, in a case that the base station of the target cell does not broadcast the UL TA before, it is indicated that the first configuration information is broadcast to the terminal device by the base station of the target cell for the first time, and in such case, the second terminal device may directly store the first configuration information.

In a case that the first configuration information is received under the condition that the second terminal device is performing random access based on the second configuration information, the second terminal device may continue adopting the second configuration information for the present random access process. In a case that the present random access process fails, the terminal device may re-initiate random access based on the first configuration information.

If the first configuration information is received under the condition that the second terminal device is performing random access based on the second configuration information, the second terminal device may stop performing random access based on the second configuration information but performs random access based on the first configuration information.

For the condition that the first configuration information is received under the condition that the second terminal device is performing random access based on the second configuration information, the second terminal device may continue performing random access based on the second configuration information until random access succeeds. Under this condition, the second configuration information is mainly applied to a terminal device that has yet not started random access.

When the first configuration information includes the configuration information of the transmission power for the preamble and the configuration information of the transmission power for the preamble includes updated initial transmission power for the preamble, the second terminal device may send the preamble based on the updated initial transmission power. When the configuration information of the transmission power for the preamble includes an updated power ramping step size, the second terminal device may perform ramping based on the updated power ramping step size and perform random access based on the ramped power.

When the first configuration information includes the configuration information of the UL TA, the second terminal device may send the first messaging the random access process to the base station of the target cell according to the configuration information of the UL TA.

The configuration information of the UL TA may include the corresponding relationship between the UL TA and the first parameter. The operation that the second terminal device may send the first message in the random access process to the base station of the target cell according to the configuration information of the UL TA may include that: the second terminal device determines a target UL TA required to be adopted by the second terminal device according to the configuration information of the UL TA and the first parameter obtained by measurement. The first parameter may include at least one of the following information: beam information of the target cell, the signal quality of the target cell, the signal quality of the at least one beam in the target cell, and position information of the second terminal device. The second terminal device may send the first message in the random access process to the base station of the target cell based on the target UL TA.

The random access process of the second terminal device will be described below with the UL TA as an example.

There is made such a hypothesis that the configuration information broadcast by the base station of the target cell includes the configuration information of the UL TA.

In a case that the UL TA is configured in the first configuration information, the second terminal device may send the preamble based on the UL TA. When the second terminal device is performing random access, the second terminal device may stop present random access and re-send the preamble based on the UL TA. Or, the second terminal device may continue present random access and re-send the preamble based on the UL TA after present random access fails.

For the condition that the configuration information includes the sequence of the signal quality of the at least one beam, the base station of the target cell may broadcast UL TAs corresponding to different sequences. The second terminal device, after receiving the configuration information, may measure and sequence the signal quality of the at least one beam and determine the target UL TA corresponding to a preset position based on a determined sequencing result and the UL TAs, broadcast by the base station of the target cell, corresponding to different sequences. Furthermore, the second terminal device may send the preamble to the base station of the target cell based on the determined target UL TA.

For the condition that the configuration information includes the SSB meeting the threshold, the base station of the target cell may configure the threshold of the SSB and the SSB group meeting the threshold, different SSB groups corresponding to different UL TAs. The second terminal device, after receiving the configuration information, may measure SSBs (or called beams) of the target cell and determine an SSB group meeting the threshold. Then, the second terminal device may determine the target UL TA required to be adopted for the present position according to the determined SSB group and a corresponding relationship, broadcast by the base station of the target cell, between different SSBs and UL TAs. Furthermore, the second terminal device may send the preamble to the base station of the target cell based on the determined target UL TA.

It can be understood that the SSB group determined by the second terminal device is not always completely the same as the SSB group broadcast by the base station of the target cell. For convenient description, the SSB group determined by the second terminal device is called a first SSB group and the SSB group broadcast by the base station of the target cell is called a second SSB group. When the first SSB group and the second SSB group are intersected, the UL TA corresponding to the second SSB may be determined as the target UL TA required to be adopted by the second terminal device.

For example, in a case that the first SSB group includes all SSBs in the second SSB group, the UL TA corresponding to the second SSB may be determined as the target UL TA required to be adopted by the second terminal device. For another example, in a case that the number of the same SSBs in the first SSB group and the second SSB group exceeds a preset threshold, the UL TA corresponding to the second SSB may be determined as the target UL TA required to be adopted by the second terminal device.

For the other information in the first parameter, a manner that the second terminal device determines the target UL TA may be similar to the above-described manner and will not be elaborated herein.

The second terminal device may send the first message in the random access process based on the selected UL TA, or, the second terminal device may send the preamble for the random access based on the selected UL TA.

The base station of the target cell may also broadcast a corresponding relationship between a first parameter and a transmission power for a preamble, so that the second terminal device may select different transmission power to send the preamble based on different positions. A manner that the base station of the target cell broadcasts the corresponding relationship between the first parameter and the transmission power for the preamble is similar to the manner that the base station of the target cell broadcasts the first parameter and the UL TA, a manner that the second terminal device determines target transmission power is also similar to the manner that the second terminal device determines the UL TA, and elaborations are omitted herein. The random access method according to the embodiments of the disclosure is described above in detail and devices according to the embodiments of the disclosure will be described below in combination with FIG. 9 to FIG. 14. The technical characteristics described in the method embodiments are applied to the following apparatus embodiments.

Figure 9:
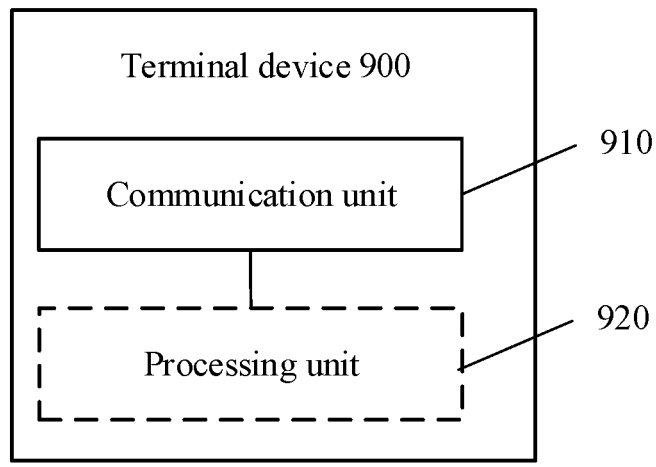
FIG. 9 is a schematic block diagram of a terminal device according to an embodiment of the disclosure.

FIG. 9 is a schematic block diagram of a terminal device according to an embodiment of the disclosure. The terminal device may be any above-described terminal device. For example, the terminal device may be the above-described first terminal device. The terminal device 900 in FIG. 9 includes a communication unit 910.

The communication unit 910 is configured to initiate random access to a base station of a target cell and send first information to the base station of the target cell, the first information including at least one of the following information: a UL TA and a power parameter for transmitting a preamble.

Optionally, the first information may further include at least one of the following information: the preamble used by the terminal device for the random access, identification information of the target cell, signal quality of the target cell, a beam index adopted by the terminal device, signal quality of at least one beam in the target cell, a sequence of the signal quality of the at least one beam in the target cell and position information of the terminal device.

Optionally, the signal quality of the target cell includes at least one of the following information: RSRP of the target cell, RSRQ of the target cell, and an SINR of the target cell.

Optionally, the signal quality of the at least one beam in the target cell may include at least one of the following information: RSRP of the at least one beam as well as an index of the at least one beam, RSRQ of the at least one beam as well as the index of the at least one beam, and an SINR of the at least one beam as well as the index of the at least one beam.

Optionally, the power parameter configured for transmitting a preamble may include a power ramping count in a random access process and/or a power level of the terminal device.

Optionally, the first information may include the power parameter for transmitting a preamble, and the first information further includes at least one of the following information: the signal quality of the target cell, the signal quality of the at least one beam in the target cell, the sequence of the signal quality of the at least one beam in the target cell and the position information of the terminal device.

Optionally, the first information may be sent to the base station of the target cell by the terminal device after random access is completed.

Optionally, the first information may include the UL TA, and the first information may further include at least one of the following information: the signal quality of the target cell, the signal quality of the at least one beam in the target cell, the sequence of the signal quality of the at least one beam in the target cell, and the position information of the terminal device.

Optionally, the communication unit 910 is configured to, under the condition that the base station of the target cell supports a function of optimizing a parameter for random access, send the first information to the base station of the target cell.

Optionally, the communication unit 910 is configured to receive a request message from the base station of the target cell. The request message is configured to instruct the terminal device to send the first information to the base station of the target cell, and send the first information to the base station of the target cell based on the request message.

Optionally, the communication unit 910 is further configured to, after random access succeeds, send first indication information to the base station of the target cell. The first indication information is configured to indicate that the first information is recorded in the terminal device, and receive the request message from the base station of the target cell based on the first indication information.

Optionally, the communication unit 910 is configured to receive second indication information from the base station of the target cell. The second indication information is configured to indicate that the base station of the target cell supports a capability of optimizing the parameter for random access, and send the first indication information to the base station of the target cell based on the second indication information.

Optionally, the second indication information may be broadcast by the base station of the target cell through a system message.

Optionally, the first indication information may be born in at least one of the following messages: an RRC connection establishment complete message, an RRC reestablishment complete message, and an RRC connection resume complete message.

Optionally, the terminal device may further include a processing unit 920. The processing unit 920 is configured to record the first information in the random access process or record the first information after random access is completed.

Optionally, the first information may be recorded at at least one moment of the following moments: a moment when the terminal device receives an RAR message from the base station of the target cell, a moment when the terminal device sends the preamble and a moment when the terminal device completes random access.

Optionally, random access initiated to the base station of the target cell by the terminal device may be contention-based random access. The moment when the terminal device succeeds in random access may include a moment when the terminal device receives a message indicating that a contention is successfully resolved.

Optionally, random access initiated to the base station of the target cell by the terminal device may be contention-free random access. The moment when the terminal device succeeds in random access may include the moment when the terminal device receives the RAR message.

Optionally, the UL TA may be acquired from the RAR message.

Optionally, the first information may be configured for the base station of the target cell to update or configure the UL TA and/or the transmission power for the preamble.

Figure 10:
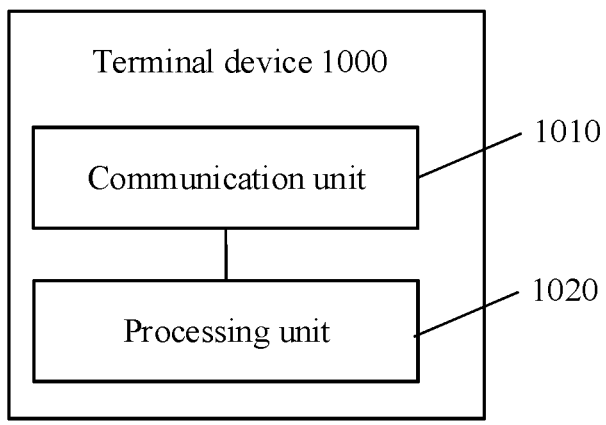
FIG. 10 is a schematic block diagram of another terminal device according to an embodiment of the disclosure.

FIG. 10 is a schematic block diagram of a terminal device according to an embodiment of the disclosure. The terminal device may be any above-described terminal device. For example, the terminal device may be the above-described second terminal device. The terminal device 1000 in FIG. 10 includes a communication unit 1010 and a processing unit 1020.

The communication unit 1010 is configured to, before random access succeeds, receive updated first configuration information from a base station of a target cell, the first configuration information including at least one of the following information: the configuration information of the transmission power for the preamble and configuration information of the UL TA. The processing unit 1020 is configured to perform random access based on the updated first configuration information.

Optionally, the configuration information of the transmission power for the preamble may include at least one of the following information: expected receiving power for the preamble, an offset of the transmission power for the preamble, and an adjustment step size of the transmission power for the preamble.

Optionally, the configuration information of the UL TA may include the UL TA and/or a corresponding relationship between the UL TA and a first parameter. The first parameter may include at least one of the following information: the preamble for the random access, identification information of the target cell, signal quality of the target cell, signal quality of at least one beam in the target cell, a sequence of the signal quality of the at least one beam in the target cell, position information of the terminal device, a threshold of an SSB, and an SSB group meeting the threshold.

Optionally, the signal quality of the target cell may include at least one of the following information: RSRP of the target cell, RSRQ of the target cell and an SINR of the target cell.

Optionally, the signal quality of the at least one beam in the target cell may include at least one of the following information: RSRP of the at least one beam as well as an index of the at least one beam, RSRQ of the at least one beam as well as the index of the at least one beam, and an SINR of the at least one beam as well as the index of the at least one beam.

Optionally, the processing unit 1020 is configured to update stored second configuration information to the first configuration information. The second configuration information may be configuration information sent by the base station of the target cell before the terminal device receives the first configuration information.

Optionally, the first configuration information may be received when the terminal device is performing random access based on the second configuration information. The processing unit 1020 is configured to control the terminal device to stop performing random access based on the second configuration information and control the terminal device to perform random access based on the first configuration information.

Optionally, the first configuration information may be received when the terminal device is performing random access based on the second configuration information. The processing unit 1020 is configured to control the terminal device to continue performing random access based on the second configuration information and, after random access performed based on the second configuration information fails, control the terminal device to perform random access based on the first configuration information.

Optionally, the first configuration information may include updated configuration information of the transmission power for the preamble.

The communication unit 1010 is configured to perform random access based on the updated configuration information of the transmission power for the preamble.

Optionally, the first configuration information may include configuration information of the UL TA. The communication unit 1010 is configured to send a first message in a random access process to the base station of the target cell according to the configuration information of the UL TA.

Optionally, the configuration information of the UL TA may include the corresponding relationship between the UL TA and the first parameter. The processing unit 1020 is configured to determine a target UL TA required to be adopted by the terminal device according to the configuration information of the UL TA and the first parameter obtained by measurement. The first parameter may include at least one of the following information: beam information of the target cell, the signal quality of the target cell, the signal quality of the at least one beam in the target cell, and the position information of the terminal device. The communication unit 1010 is configured to send the first messaging the random access process to the base station of the target cell based on the target UL TA.

Optionally, the updated first configuration information may be received by the terminal device before receiving an RAR message.

Figure 11:
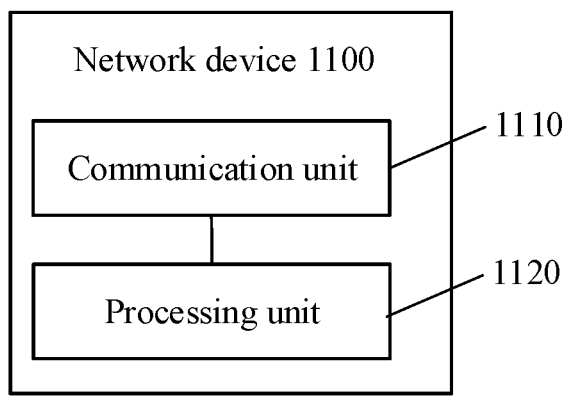
FIG. 11 is a schematic block diagram of a network device according to an embodiment of the disclosure.

FIG. 11 is a schematic block diagram of a network device according to an embodiment of the disclosure. The network device may be any above-described network device. For example, the network device may be the above-described base station of the target cell. The network device 1100 in FIG. 11 includes a communication unit 1110 and a processing unit 1120.

The communication unit 1110 is configured to acquire first information, the first information including at least one of the following information: a UL TA and a power parameter for transmitting a preamble. The processing unit 1120 is configured to update or configure configuration information of the transmission power for the preamble and/or configuration information of the UL TA in a random access process according to the first information.

Optionally, the first information may further include at least one of the following information: a preamble for random access of a terminal device, identification information of a target cell, signal quality of the target cell, signal quality of at least one beam in the target cell, a sequence of the signal quality of the at least one beam in the target cell and position information of the terminal device.

Optionally, the signal quality of the target cell may include at least one of the following information: RSRP of the target cell, RSRQ of the target cell and an SINR of the target cell.

Optionally, the signal quality of the at least one beam in the target cell may include at least one of the following information: RSRP of the at least one beam as well as an index of the at least one beam, RSRQ of the at least one beam as well as the index of the at least one beam, and an SINR of the at least one beam as well as the index of the at least one beam.

Optionally, the configuration information of the transmission power for the preamble may include at least one of the following information: expected receiving power for the preamble, an offset of the transmission power for the preamble, and an adjustment step size of the transmission power for the preamble.

Optionally, the configuration information of the UL TA may include the UL TA and/or a corresponding relationship between the UL TA and a first parameter. The first parameter may include at least one of the following information: the preamble for the random access, the identification information of the target cell, the signal quality of the target cell, the signal quality of the at least one beam in the target cell, the sequence of the signal quality of the at least one beam in the target cell, the position information of the terminal device, a threshold of an SSB, and an SSB group meeting the threshold.

Optionally, the communication unit 1110 is configured to receive first indication information from the terminal device. The first indication information is configured to indicate that the first information is recorded in the terminal device, and send a request message to the terminal device. The request message is configured to instruct the terminal device to send the first information to a base station of the target cell.

Optionally, the first indication information may be born in at least one of the following messages: an RRC connection establishment complete message, an RRC reestablishment complete message, and an RRC connection resume complete message.

Optionally, the communication unit 1110 is further configured to broadcast the updated configuration information of the transmission power for the preamble and/or configuration information of the UL TA through a system message.

Optionally, the communication unit 1110 is further configured to broadcast second indication information. The second indication information is configured to indicate that the base station of the target cell supports a function of optimizing a parameter in the random access process. The second indication information is configured to instruct the terminal device to send the first information to the base station of the target cell.

Optionally, the communication unit 1110 is further configured to broadcast the updated or configured configuration information of the transmission power for the preamble and/or configuration information of the UL TA through a system message.

Figure 12:
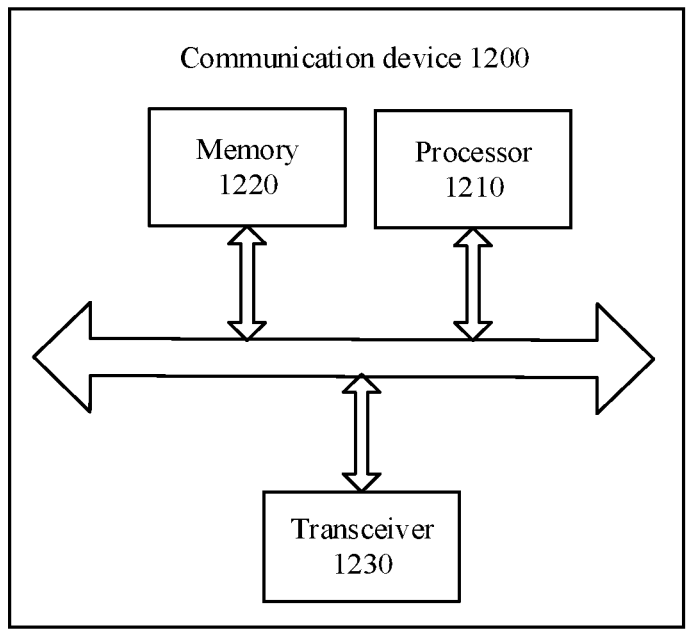
FIG. 12 is a schematic structure diagram of a communication device according to an embodiment of the disclosure.

FIG. 12 is a schematic structure diagram of a communication device 1200 according to an embodiment of the disclosure. The communication device 1200 shown in FIG. 12 includes a processor 1210, and the processor 1210 may call and run a computer program in a memory to implement the method in the embodiments of the disclosure.

Optionally, as shown in FIG. 12, the communication device 1200 may further include the memory 1220. The processor 1210 may call and run the computer program in the memory 1220 to implement the method in the embodiments of the disclosure.

The memory 1220 may be an independent device independent of the processor 1210 and may also be integrated into the processor 1210.

Optionally, as shown in FIG. 12, the communication device 1200 may further include a transceiver 1230, and the processor 1210 may control the transceiver 1230 to communicate with another device, specifically sending information or data to the other device or receiving information or data from the other device.

The transceiver 1230 may include a transmitter and a receiver. The transceiver 1230 may further include antennae. The number of the antennae may be one or more.

Optionally, the communication device 1200 may specifically be the network device of the embodiments of the disclosure. The communication device 1200 may implement corresponding flows implemented by the network device in each method of the embodiments of the disclosure. For simplicity, elaborations are omitted herein.

Optionally, the communication device 1200 may specifically be the mobile terminal/terminal device of the embodiments of the disclosure. The communication device 1200 may implement the corresponding flows implemented by the mobile terminal/terminal device in each method of the embodiments of the disclosure. Specifically, the communication device 1200 may implement the corresponding flows implemented by the first terminal device and/or the second terminal device in each method of the embodiments of the disclosure. For simplicity, elaborations are omitted herein.

Figure 13:
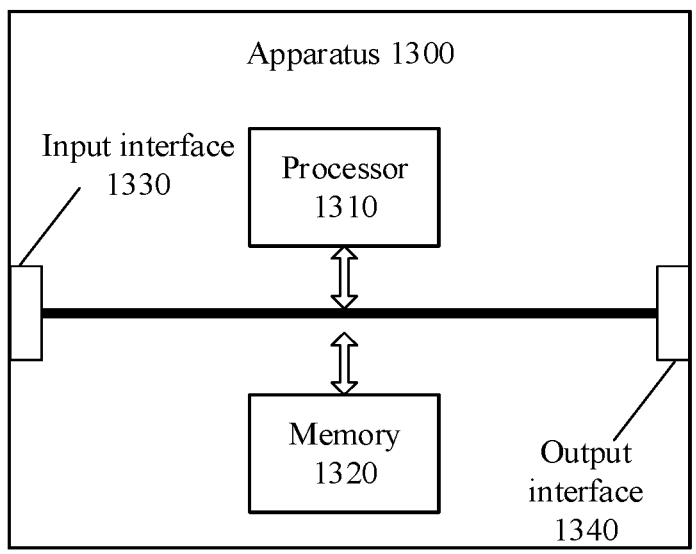
FIG. 13 is a schematic structure diagram of an apparatus according to an embodiment of the disclosure.

FIG. 13 is a schematic structure diagram of an apparatus according to another embodiment of the disclosure. The apparatus 1300 shown in FIG. 13 includes a processor 1310. The processor 1310 may call and run a computer program in a memory to implement the method in the embodiments of the disclosure.

Optionally, as shown in FIG. 13, the apparatus 1300 may further include the memory 1320. The processor 1310 may call and run the computer program in the memory 1320 to implement the method in the embodiments of the disclosure.

The memory 1320 may be an independent device independent of the processor 1313 and may also be integrated into the processor 1310.

Optionally, the apparatus 1300 may further include an input interface 1330. The processor 1310 may control the input interface 1330 to communicate with another device or apparatus, specifically acquiring information or data from the another device or apparatus.

Optionally, the apparatus 1300 may further include an output interface 1340. The processor 1310 may control the output interface 1340 to communicate with another device or apparatus, specifically outputting information or data sent by the another device or apparatus.

Optionally, the apparatus may be applied to the network device of the embodiments of the disclosure. The apparatus may implement corresponding flows implemented by the network device in each method of the embodiments of the disclosure. For simplicity, elaborations are omitted herein.

Optionally, the apparatus may be applied to the mobile terminal/terminal device of the embodiment of the disclosure. The apparatus may implement corresponding flows implemented by the mobile terminal/terminal device in each method of the embodiment of the disclosure. For simplicity, elaborations are omitted herein.

It is to be understood that the apparatus mentioned in the embodiment of the disclosure may be a chip. The chip may also be called a system-level chip, a system chip, a chip system or a system on chip, etc.

Figure 14:
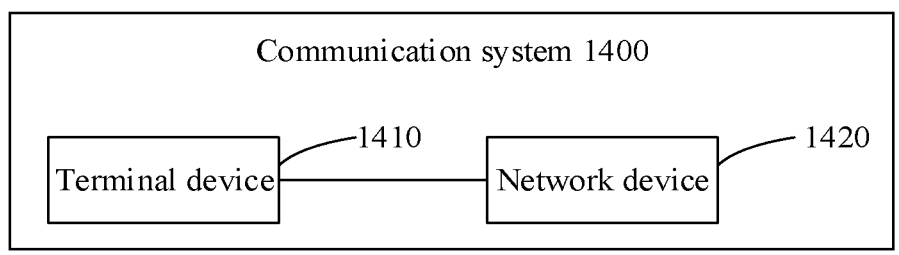
FIG. 14 is a schematic block diagram of a communication system according to an embodiment of the disclosure.

FIG. 14 is a second block diagram of a communication system 1400 according to an embodiment of the disclosure. As shown in FIG. 14, a communication system 1400 includes a terminal device 1410 and a network device 1420.

The terminal device 1410 may be configured to realize corresponding functions realized by the terminal device in the method. The network device 1420 may be configured to realize corresponding functions realized by the network device in the method. For simplicity, elaborations are omitted herein.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure. The computer program causes a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure. The computer program causes a computer to execute corresponding flows implemented by the mobile terminal/terminal device in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure. The computer program instruction causes a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure. The computer program instruction causes the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure. The computer program runs in a computer to cause the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure. The computer program runs in the computer to cause the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated. Parts displayed as units may or may not be physical units, and namely may be located in the same place, or may also be distributed to multiple network units. Part or all of the units may be selected to achieve the solutions of the embodiments according to a practical requirement.

In addition, each functional unit in each embodiment of the disclosure may be integrated into a processing unit. Each unit may also physically exist independently. Two or more than two units may also be integrated into a unit.

When being realized in form of software functional unit and sold or used as an independent product, the function may also be stored in a computer-readable storage medium. For such an understanding, the technical solutions of the disclosure substantially or parts making contributions to the conventional art or part of the technical solutions may be embodied in form of software product. The computer software product may be stored in a storage medium, including a plurality of instructions configured to cause a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for communication, comprising:
in response to a terminal device initiating random access to a base station of a target cell and the random access being successful, sending, by the terminal device, first information to the base station of the target cell, the first information comprising a parameter related to transmission power for a preamble,
identification information of the target cell and
a beam index used by the terminal device.

2. The method of claim 1, wherein the first information further comprises at least one of following information:
signal quality of the target cell;
signal quality of at least one beam in the target cell;
a sequence of the signal quality of the at least one beam in the target cell; or
position information of the terminal device.

3. The method of claim 2, wherein the signal quality of the target cell comprises at least one of following information:
reference signal receiving power (RSRP) of the target cell;
reference signal received quality (RSRQ) of the target cell; or
a signal-to-interference-and-noise-ratio (SINR) of the target cell.

4. The method of claim 1, wherein a power parameter configured for transmitting the preamble comprises:
a power level of the terminal device.

5. A method for communication, comprising:
acquiring, by a base station of a target cell, first information, the first information comprising a parameter related to transmission power for a preamble, identification information of the target cell and a beam index used by the terminal device; and
updating or configuring, by the base station of the target cell, configuration information related to the transmission power for the preamble during the random access according to the first information.

6. The method of claim 5, wherein the first information further comprises at least one of following information:
signal quality of the target cell;
signal quality of at least one beam in the target cell;
a sequence of the signal quality of the at least one beam in the target cell; or
position information of the terminal device.

7. The method of claim 6, wherein the signal quality of the target cell comprises at least one of following information:
reference signal receiving power (RSRP) of the target cell;
reference signal received quality (RSRQ) of the target cell; or
a signal-to-interference-and-noise-ratio (SINR) of the target cell.

8. The method of claim 5, wherein the configuration information related to the transmission power for the preamble comprises at least one of following information:
expected receiving power for the preamble;
an offset of the transmission power for the preamble; or
an adjustment step of the transmission power for the preamble.

9. The method of claim 5, further comprising:
broadcasting, by the base station of the target cell, at least one of the updated or configured configuration information related to the transmission power for the preamble through a system message.

10. A terminal device, comprising a transceiver, wherein the transceiver is configured to: in response to a terminal device initiating random access to a base station of a target cell and the random access being successful,
send first information to the base station of the target cell, the first information comprising a parameter related to transmission power for a preamble, identification information of the target cell and a beam index used by the terminal device.

11. The terminal device of claim 10, wherein the transceiver is configured to:
send the first information to the base station of the target cell under a condition that the base station of the target cell supports a function of optimizing a parameter for random access.

12. The terminal device of claim 10, wherein the transceiver is configured to:
receive a request message from the base station of the target cell, the request message being configured to instruct the terminal device to send the first information to the base station of the target cell; and
send the first information to the base station of the target cell based on the request message.

13. The terminal device of claim 12, wherein the transceiver is further configured to:
send first indication information to the base station of the target cell, the first indication information being configured to indicate that the first information is recorded in the terminal device; and
receive the request message from the base station of the target cell based on the first indication information.

14. The terminal device of claim 10, further comprising a processor, wherein the processor is configured to:
record the first information during the random access; or,
record the first information after the random access is completed.

15. A network device, comprising:
a processor,
a memory configured to store a computer program executable by the processor; and
a transceiver connected to the processor and configured to send and receive information under control of the processor;
wherein the processor is configured to call and run the computer program stored in the memory to implement the method of claim 5.

16. The network device of claim 15, wherein the first information further comprises at least one of following information:
signal quality of the target cell;
signal quality of at least one beam in the target cell;
a sequence of the signal quality of the at least one beam in the target cell; or
position information of the terminal device.

17. The network device of claim 16, wherein the signal quality of the target cell comprises at least one of following information:
reference signal receiving power (RSRP) of the target cell, reference signal received quality (RSRQ) of the target cell, or a signal-to-interference-and-noise-ratio (SINR) of the target cell.

18. The network device of claim 15, wherein the configuration information related to the transmission power for the preamble comprises at least one of following information:

expected receiving power for the preamble, an offset of the transmission power for the preamble, or an adjustment step of the transmission power for the preamble.

19. The network device of claim 15, wherein the transceiver is further configured to broadcast the updated or configured at least one of configuration information related to the transmission power for the preamble through a system message.

* * * * *